Dec. 13, 1960  S. W. HOSKINS  2,964,286
SOLENOID-OPERATED VALVE MECHANISM
Filed Aug. 23, 1957
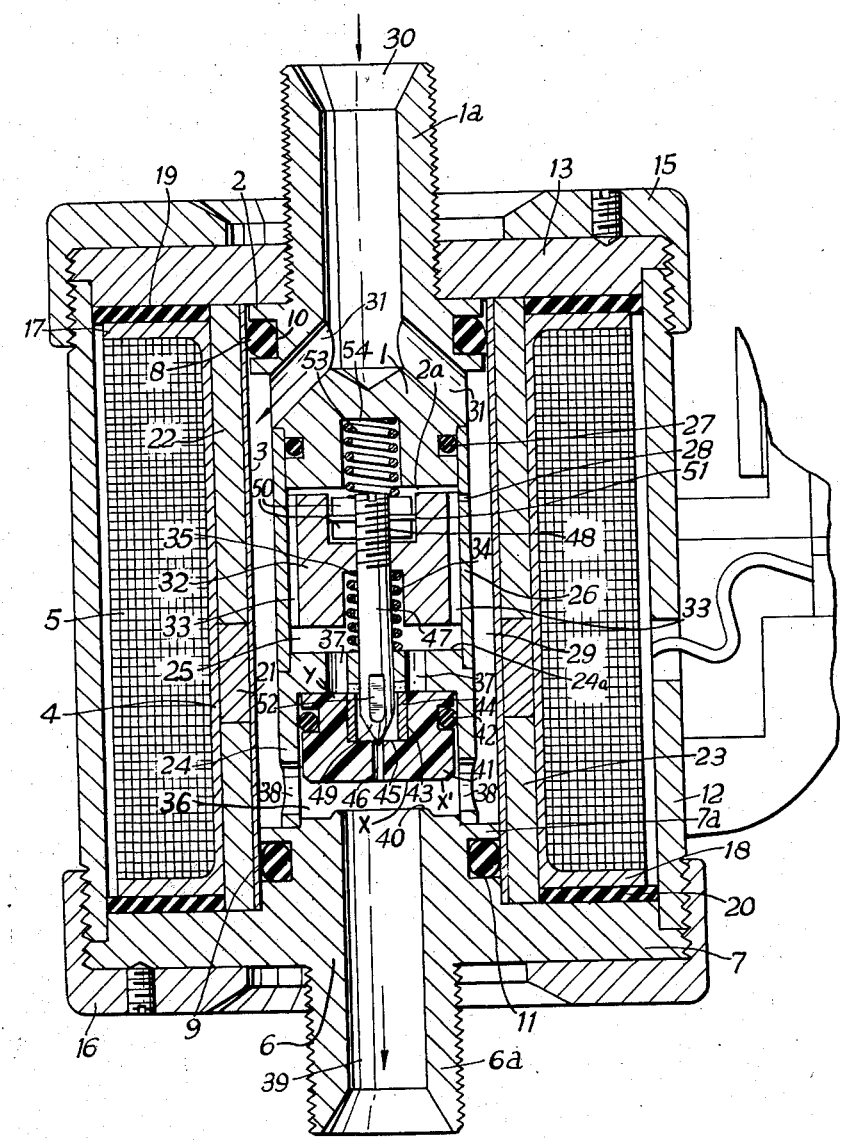
INVENTOR
Stanley Williams Hoskins
BY
ATTORNEY

United States Patent Office 2,964,286
Patented Dec. 13, 1960

2,964,286

SOLENOID-OPERATED VALVE MECHANISM

Stanley W. Hoskins, Southall, England, assignor to I. V. Pressure Controllers Limited, Feltham, England Filed Aug. 23, 1957, Ser. No. 679,970

10 Claims. (Cl. 251—30)

This invention relates to a solenoid-operated valve mechanism for use in controlling the flow of pressure fluid (such as compressed air) in a pipe line from a source of supply to a place of use of the fluid, the valve mechanism being of the kind which is arranged within the winding of the solenoid and includes a main valve, the seating and unseating movements of which valve are controlled by an armature co-operating with a pole piece within the solenoid winding.

The present invention provides a solenoid-operated valve mechanism of the kind referred to, wherein a pilot valve is connected to an armature which is associated with a pole piece in which the main valve is slidable towards and away from its seat, and wherein the main valve is unseated when the solenoid is de-energised, in which circumstances the flow of fluid pressure from the inlet of the valve assembly to the outlet takes place through a substantially unobstructed path and said fluid pressure exerts pressure on the bottom face of the main valve adjacent its seat, in which position the pilot valve opens a fluid outlet passage through the main valve, while fluid which follows a more obstructed path from the inlet, and is therefore at a lower pressure, acts on the upper face of the main valve so that there is a pressure differential across the main valve causing the latter to remain open. On the other hand, when the solenoid is energised, the pilot valve closes the said passage through the main valve thus preventing the flow of fluid through the latter and causes pressure to be built up on the upper face of the main valve, which latter is moved towards its seat by an excess of pressure acting of its upper face, the arrangement being such that the pressure differential thus created causes the main valve to seat while the pilot valve assists the seating of the valve.

One construction is more fully described hereinafter, wherein the armature is slidably arranged in an armature chamber which communicates at its end remote from the pole piece through at least one bleed port with a fluid space which surrounds the main valve and the armature chamber and is connected to the fluid inlet, the armature chamber also communicating at its opposite end with a housing in the pole piece in which the main valve is slidable and the armature being so constructed that fluid entering the armature chamber from the said fluid space may flow through the armature to the opposite end of the armature chamber. In the same construction the main valve housing is provided with at least one port which provides a substantially unobstructed communication between the said fluid space and the housing. The armature chamber is in constant communication with the main valve housing through at least one port in the pole piece which connects the armature chamber to the housing. The main valve seat is disposed within the main valve housing and is provided upon the upper face of a boss forming part of an outlet union. The pilot valve seat is formed by the upper end of the said fluid outlet in the main valve, which end communicates with the base of a recess in, and extending downwards from the upper face of, the main valve, the pilot valve being formed with flats or equivalent which in any position of the pilot valve allow fluid pressure from the armature chamber to enter the said recess in the main valve and thus, if the pilot valve is seated, to act upon the base of the recess; whereas, if the pilot valve is unseated, fluid pressure entering the said recess will flow through the outlet passage in the main valve into the outlet. The armature and thus the pilot valve are normally thrust upwards by a spring acting upon the armature, this upward force being opposed by another spring of less strength acting in the opposite direction upon the armature.

Further constructional features of the valve mechanism will be described hereinafter.

The accompanying drawing shows one constructional form of the invention by way of example.

In this constructional form of the invention, the valve assembly comprises a cylindrical body member 1, of brass or other non-magnetic material, provided at its outer end with an externally threaded tubular union 1a, forming an inlet conduit 30, for connection in the fluid line (not shown) and with a lateral circumferential boss 2 at its juncture with said tubular union. The boss 2 fits in the upper end of a brass tube 3, forming part of an assembly described hereinafter, which acts as a composite support for the central tube 4 of the solenoid coil 5. The valve assembly further comprises fluid outlet member 6, of soft iron, arranged in spaced and coaxial relation with the inlet member 1. The outlet member 6 has an externally threaded tubular union 6a forming a conduit 39 for connection in the fluid line (not shown) and a lateral circumferential flange 7 medial of its length and formed with a cylindrical boss 7a at its inner end which is fitted in the other or lower end of the above mentioned brass tube 3 forming part of the support for the solenoid inner tube. Fluid leakage between the two bosses 2 and 7a and the inner wall of the brass tube 3 is prevented by O-sealing rings 8 and 9 which are arranged in circumferential annular grooves 10 and 11 formed in the bosses.

The solenoid assembly is fitted within a mild steel outer casing 12, the upper end of which is arranged in an annular rabbet formed in a mild steel end plate 13 which is screwed upon the inlet union 1a. The lower end of the outer casing 12 is fitted similarly in an annular rabbet formed in the flange 7 of the outlet union 6 and the whole assembly is locked together by means of flanged end caps 15 and 16 which are screwed upon threads formed at the opposite ends of the outer casing 12.

The solenoid assembly is arranged within the outer casing 12 and surrounds the above mentioned composite solenoid assembly support 3 and the upper and lower end flanges 17 and 18 of the inner or central tube 4 of the solenoid are arranged respectively below and above annular discs 19 and 20, of resilient insulating material, fitted around the composite solenoid assembly support. As mentioned above, the composite solenoid assembly support comprises the brass tube 3 which is fitted within a composite structure consisting of a sleeve 21 made of brass arranged between upper and lower soft iron sleeves 22 and 23.

The cylindrical body member 1 is of less diameter than the brass tube 3 so that an annular space is formed between its external surface and the inner wall of the brass tube 3. The boss 7a of the outlet union 6 has its inner face fitted with a hollow soft iron cylindrical pole piece 24 which projects upwardly for a distance towards the body member 1 forming a cage-like valve housing of the same external diameter as the body member 1 of the inlet union and thus provides an annular space between its external surface and the inner wall of the brass tube 3.

The inner or opposing ends of the member 1 and the pole-piece 24 have flat faces 2a and 24a, respectively, which are spaced from each other to form an armature chamber 25 and are interconnected by a brass guide tube 26, the upper end of which is fitted in an annular rabbeted groove formed on the exterior surface of the body member 1 while its lower end is similarly fitted in a rabbeted groove in the pole-piece 24. The body member 1 is formed with an annular recess in which there is fitted an O-sealing ring 27 cooperating with the inner wall of the guide tube 26. For a purpose which will be referred to hereinafter, the guide tube 26 is formed with one or more bleed-ports 28 which are disposed adjacent to the body member 1 and provide communication between the annular space 29, formed between the guide tube 26 and the brass tube 3, and the armature chamber 25.

The conduit passage 30 of the inlet union 1a extends through the latter to a point within the boss 2 and, by means of inclined inlet passages 31, it is connected to the upper end of the annular space 29 between the guide tube 26 and the brass tube 3. A cylindrical armature 32, made of soft iron and formed with two longitudinal slots 33, is slidable in the armature chamber 25 between the flat surfaces 2a and 24a of the body member 1 and the pole-piece 24 of the inlet and outlet unions. Thus, in conditions which will be described hereinafter, the armature can slide from the upper position (shown on the drawing) in which it is adjacent to the flat surface 2a of the inlet union 1a to a lower position in which it is adjacent to the flat surface 24a of the outlet union 6. When fluid pressure flows from the inlet 30 to the outlet passage 39, i.e. when the solenoid is de-energized, the armature 32 is thrust upwards by a spring 34 which reacts between the flat surface 24a of the outlet union 6 and a shoulder 35 in the armature 32.

The armature chamber 25 communicates below the armature with the main valve chamber 36 (within the pole-piece 24) by means of a number of ports 37 formed in the upper wall of said pole-piece 24. Further, the main valve chamber 36 communicates with the annular space 29 between the guide tube 26 and the brass tube 3 by means of a number of lateral ports 38 formed in the side wall of the pole-piece 24. The upper end of the outlet conduit passage 39 is surrounded by a raised main valve seat 40 having a flat surface of an area less than the area of the surface $x$ of the main valve 41.

The main valve 41 is cylindrical and is slidably disposed in the valve chamber 36 and has flat surfaces $x$ and $y$ at its opposite ends. The valve 41 is made of nylon or other suitable flexible plastic, such as P.V.C., synthetic rubber, terylene or P.T.F.E. The seating surface $x$ of the main valve 41 is adapted to cooperate with the flat surface of the main valve seat 40. The side surface of the main valve 41 is formed with a circumferential annular groove adjacent to its other flat surface $y$ and in which there is fitted an O-sealing ring 42 cooperating with the wall of the main valve chamber 36. The central portion of the flat surface $y$ of the main valve 41 is also formed with a recess 43 which extends for some distance inwardly of the valve and is fitted with a brass reinforcing sleeve 44. The bottom wall 45 of the recess 43 has a fluid passage 46 extending axially therethrough and communicates the recess 45 with the seating surface $x$ of the valve 41 and in alignment with passage 39.

The fluid passage 46 is controlled by a pilot valve 47 in the form of a needle-valve threaded at its distal end 48 into a threaded hole formed centrally in the armature 32. The other end portion of the pilot valve 47 is formed with a conical tip 49 which is adapted to cooperate with the upper end of the passage 46 in the main valve 41, which end of said passage acts as a valve seat for the pilot valve. The pilot valve can thus be adjusted at 48 upwards and downwards relative to the armature and it can be locked in its adjusted positions by means of lock nuts 50 threaded thereon arranged above and below a washer in an upper recess 51 extending from the upper surface of the armature. The needle pilot valve 47 is formed with one or more flats 52 (i.e. flattened portions) which extend from a point on the cone tip 49 (removed from the portion that seats in the passage 46) inwardly of the pilot valve so as to provide a restricted passageway between it and the walls of the recess 43, thus allowing fluid pressure to enter into or flow through the recess 43 in any position of the pilot valve 47 relative to the main valve member 41.

With the solenoid de-energized, the armature is normally thrust upwardly by means of the coil spring 34, which reacts between the inner end 35 of the armature and the surface 24a of the pole-piece 24 and the parts are then in the position as shown in the drawing. The spring 34 thus acts to force the coned tip 49 of the pilot valve upwards. An upper coil spring 53, of less strength than the spring 34, is arranged between the upper lock nut 50 and a shoulder 54 in the body member 1 of the inlet union 1a.

Manifestly, with the parts in position as shown, the fluid pressure passing through the conduit 30 and the branch passages 31 fills the passage space 29, some of this pressure entering the armature chamber 25 through the relatively small bleed-port or ports 28; but, due to the relatively large area of the openings 38, the pressure flows more quickly into the valve chamber 36, holding the valve 41 open, and passes through the outlet passage 39.

When the solenoid 5 is energized, a magnetic force is formed in the pole-piece 24 attracting and moving the armature 32—and hence the pilot valve 47—against the opposing force of the spring 34. Thus, the conical tip 49 of the pilot valve 47 engages into the axial passage 46 of the main valve 41. In this condition of the parts, the fluid pressure entering the armature chamber 25, through the bleed-port 28, builds up therein and, together with the pressure exerted by the spring 53, exerts sufficient pressure on the surface $y$ of the main valve 41 (through passages 33, 37 and flats 52) to exceed the fluid pressure being exerted on its exposed face $x$, thus moving the main valve upon its valve seat 40 and forcefully holding it closed and cutting off the passage of the fluid pressure from the inlet conduit 30 to the outlet conduit 39. The force of the spring 53 assists in this movement of the armature and, hence, maintains the cone tip 49 of the pilot valve in closed seating engagement with the passage 46 during this operation and while the solenoid is energized.

Now, with the parts in the position just mentioned in the preceding paragraph and should the solenoid 5 be de-energized, the spring 34 (being of greater strength than spring 53) thrusts the armature toward the body member 1 (i.e. upwardly in the drawing) and, hence, the pilot valve 47. This movement of the pilot valve 47 opens the passage 46 in the main valve and vents the pressure in the armature chamber 25, acting on the main valve surface $y$ in the valve chamber 36, through and beyond the main valve 41 into the conduit 39, thus reducing the pressure in the armature chamber below the value of the pressure acting directly through the larger ports 38 on the partially exposed portion $x'$ of surface $x$ of the main valve 41, resulting in the main valve being moved off of and away from its seat 40 to the position indicated in the drawing and allowing the direct passage of the fluid pressure from the inlet conduit 30, through the space 29 and through the outlet conduit 39. The main valve 41 is maintained in its open position shown by the pressure entering the valve chamber 36 through the relatively larger ports 38 and acting on its entire exposed surface $x$. In the position of the main valve 41 as shown, the cone tip 49 of the pilot valve does not close the passage 46 in the main valve, but allows the pressure entering the bleed-port 28 from the passage 29, to pass through the armature chamber 25, through ports 37, flats 52 and passage 46 in the valve housing or chamber 36, or conversely.

Reference has been made above to the composite solenoid support comprising the brass tube 3 upon which the brass sleeve 21 is arranged between upper and lower soft iron sleeves 22 and 23. It has been found that if the central transverse plane of the brass sleeve is slightly below the top face of the pole-piece 24 the lines of magnetic flux will bunch or swell inwards and concentrate around the tip of the pole-piece and the magnetic attraction will be increased.

That which is claimed, as new and to be secured by Letters Patent, is:

1. A solenoid-operated valve mechanism of the type described, for controlling fluid pressure flowing therethrough, comprising a conduit means having an inlet and an outlet for the flow of fluid pressure therethrough; a main valve seat encompassing said outlet; a solenoid coil surrounding said conduit; a housing forming a main valve chamber disposed in said conduit adjacent said valve seat; a main piston type valve mounted in said chamber for to-and-fro movement relative to said valve seat to open and close said outlet and to have at least a portion thereof on its seating side exposed to the action of said fluid at inlet pressure tending to move said main valve to open position, said main valve having a pilot passage therethrough communicating opposite sides of said valve and aligned with said outlet; a second housing in said conduit forming a second chamber between said main valve chamber and said inlet and communicating with said main valve chamber and spaced from the walls of said conduit; an armature for said solenoid coil slidably disposed in said second chamber; passage means of more destricted area than said conduit and said pilot passage in the main valve and communicating said conduit between its inlet and outlet with said main valve chamber on the side of the main valve opposite its seating side thereby causing a pressure differential normally maintaining said main valve open; a pilot valve connected with said armature and projecting into said main valve chamber and positioned to close said pilot passage in said main valve, when said solenoid is energized, for permitting fluid pressure to build up on said opposite side of the main valve, which pressure, together with the movement of said armature, closes and holds the main valve on its seat; and means for moving said pilot valve to open said pilot passage in said main valve, when said solenoid is deenergized, thereby venting the pressure acting on said opposite side of said main valve, whereby said inlet pressure acting on the seating side of said main valve moves the same to open position.

2. In a pressure-closed-and-opened valve for controlling the flow of fluid pressure, a conduit having an inlet and an outlet at its respective end portions and through which a fluid, to be controlled, flows from said inlet to said outlet, a main valve seat encompassing said outlet, a main valve member disposed in said conduit and movable toward and away from said valve seat, said valve member having a surface positioned on its seating side and exposed to said fluid pressure in said conduit between its inlet and outlet at inlet pressure normally urging said main valve member away from its seat, a hollow container in said conduit and having said main valve member slidably fitted therein and having a port therein of restricted area less than the cross-sectional area of said conduit and positioned to communicate said conduit between its inlet and outlet with said container on the side of said main valve member opposite its seating side, a pilot passage through said main valve member of a cross sectional area greater than that of said port and communicating the fluid pressure on said opposite sides thereof and positioned to exhaust into said outlet, a needle-type pilot valve positioned in said container and mounted for reciprocal movement relative to said main valve member to open and close said fluid passage in said main valve member and normally biased to move to open position, a solenoid coil surrounding said conduit, and an armature for said solenoid slidably disposed in said container and carried by said pilot valve for actuating said pilot valve against its bias, when said solenoid is energized, to close said fluid passage in the main valve member, whereby the pressure passing through said restricted port builds up in said container, which, together with the movement of said armature acting on the main valve member, causes the main valve member and said needle valve to move together toward valve seat and overcomes the pressure acting on the seating side of said main valve member, thus closing and holding the main valve member on its seat to close said outlet, while said solenoid is energized.

3. In a pressure-closed-and-opened valve device for controlling the flow of fluid pressure, a conduit having an inlet and an outlet at its end portions and through which the fluid, to be controlled, flows from said inlet to said outlet, a main valve seat encompassing said outlet, a closed tubular member disposed axially of and within said conduit between said inlet and said outlet and spaced from the walls of said conduit to form a fluid passage therebetween, the end of said tubular member adjacent said outlet being open and spaced from and aligned with said outlet, stop-means within and intermediate of said tubular member dividing said tubular member into two communicating chambers, a main valve slidably fitted in one chamber between said stop means and said main valve seat and movable to-and-fro relative to said main valve seat, said main valve having surfaces inwardly of said main valve seat and positioned and exposed to said fluid in said conduit at inlet pressure, when said main valve is seated, and tending to move said main valve from said seat, port means in said tubular member dimensioned to admit fluid pressure from said conduit to the other of said chambers at a restricted flow of fluid pressure from said conduit to act on the side of said main valve opposite its seating side, a pilot fluid passage through said main valve of greater cross-sectional area than said port means and communicating opposite sides of said main valve and exhausting into said outlet, a needle-type pilot valve slidably mounted for reciprocal movement in said other of said chambers and projecting through said stop means to close the pilot fluid passage in said main valve and to open said pilot fluid passage without mechanically imparting opening movement to said main valve, means normally biasing said pilot valve to open position, and a controllable solenoid surrounding said conduit and having its armature slidably disposed in said other of said chambers and carrying said pilot valve to move said pilot valve against its bias to close said pilot fluid passage in said main valve, when the solenoid is energized, causing fluid pressure in said tubular member to build up therein on said opposite side of said main valve, when the latter is in open position, which, together with the initiating force of said solenoid while said pilot passage is closed, produces an excess of pressure to close and maintain said main valve on its seat, until the solenoid is deenergized.

4. A composite solenoid-operated valve mechanism of the type described comprising a solenoid coil having a passage therethrough forming a conduit for the passage of fluid and having an inlet end and an outlet, a main valve seat encompassing said outlet, an armature slidably mounted in a tubular housing disposed within and spaced from the interior walls of said conduit to form a portion of said conduit therebetween and a guide chamber for said armature, a housing forming a main valve chamber within and spaced from the interior walls of said conduit and positioned at one end of said armature housing and having one end encompassing said main valve seat, a main valve slidably mounted in said main valve chamber for to-and-fro movement relative to said main valve seat, port means communicating said conduit between its inlet and outlet with said main valve chamber to admit fluid pressure at the seating side of said main valve and to admit relatively restricted flow of pressure at the other side of said main valve, said main valve having a fluid passage therethrough communicating said opposite side thereof and of greater cross-sectional area than said port means which admits pressure to said other side of said main valve and positioned to exhaust into the outlet of said conduit, a pilot valve carried by said armature and positioned to close said fluid passage in said main valve when said solenoid is energized, and means moving said pilot valve to open said fluid passage in said main valve when and while said solenoid is deenergized.

5. The subject matter of claim 4, wherein the said restricted communication of the main valve chamber with said fluid conduit at the said other side of the main valve is through said armature chamber and said armature having fluid passage means therein of a greater restricted cross-sectional area than the cross sectional area of said fluid conduit, and wherein said port means includes at least one bleed-port in said armature housing at the end thereof remote from said valve chamber and communicating with the inlet side of said fluid conduit, and wherein there is passage means communicating the armature chamber with said main valve chamber.

6. The subject matter of claim 4 wherein the means for moving the pilot valve to open the passage in said main valve is a mechanical biasing means and wherein the pilot valve is adjustably mounted on said armature for varying the opening between it and said fluid passage in the main valve when the solenoid is deenergized, and wherein there is a second mechanical biasing means acting on the armature to move it toward said main valve and of less strength than said first mentioned biasing means.

7. The subject matter of claim 4 wherein the pilot valve and the fluid passage in the main valve are in axial alignment, the pilot valve being of the needle type and said fluid passage having an enlarged end portion in which the needle end portion of said pilot valve extends and having a reduced portion upon which the needle extremity of said valve seats, the needle end portion of said pilot valve being formed with at least one flat surface whereby fluid pressure may enter said enlarged portion of said passage in any position of said pilot valve relative to said main valve.

8. The subject matter of claim 4 wherein the valve housing is of a magnetic conductive metal having an open end fixedly encompassing said valve seat and forming a pole-piece of said solenoid and said main valve is of a non-magnetic attractive material, and wherein the main valve seat is an annular projection formed at the outlet portion of said fluid conduit and of a lesser area than the seating face of said main valve.

9. The subject matter of claim 4 wherein the fluid conduit means comprises a tubular wall within the solenoid coil and has inlet and outlet fittings associated with its ends, respectively, and wherein said armature housing and said valve housing are arranged end-to-end in said tube between its inlet and outlet fittings and held in fixed spaced relation to the tube, the said housings forming guide tubes for said armature and main valve, respectively.

10. The subject matter of claim 4 further characterized by the main valve housing being a soft iron and forming a pole-piece of the solenoid, the fluid conduit means comprising a brass tube spaced from the armature housing and said main valve housing, said brass tube being surrounded at a medial point by a brass sleeve lying within a transverse plane of said pole-piece; and by soft iron sleeves on either side of said brass sleeve, all of said sleeves being in end-to-end contact and in juxtaposition with said brass tube, the transverse central plane of said brass sleeve being disposed slightly beyond the inner end of said pole-piece, and by the solenoid coil windings surrounding said sleeves.

References Cited in the file of this patent
UNITED STATES PATENTS

| | | |
|---|---|---|
| 1,723,359 | Larner | Aug. 6, 1929 |
| 1,793,252 | Roth | Feb. 17, 1931 |
| 2,061,239 | Larner | Nov. 17, 1936 |
| 2,654,393 | Ghormley | Oct. 6, 1953 |
| 2,693,929 | Hart | Nov. 9, 1954 |
| 2,735,445 | Ray | Feb. 21, 1956 |
| 2,805,038 | Towler | Sept. 3, 1957 |

FOREIGN PATENTS

| | | |
|---|---|---|
| 524,366 | Canada | of 1956 |